Patented Aug. 1, 1950

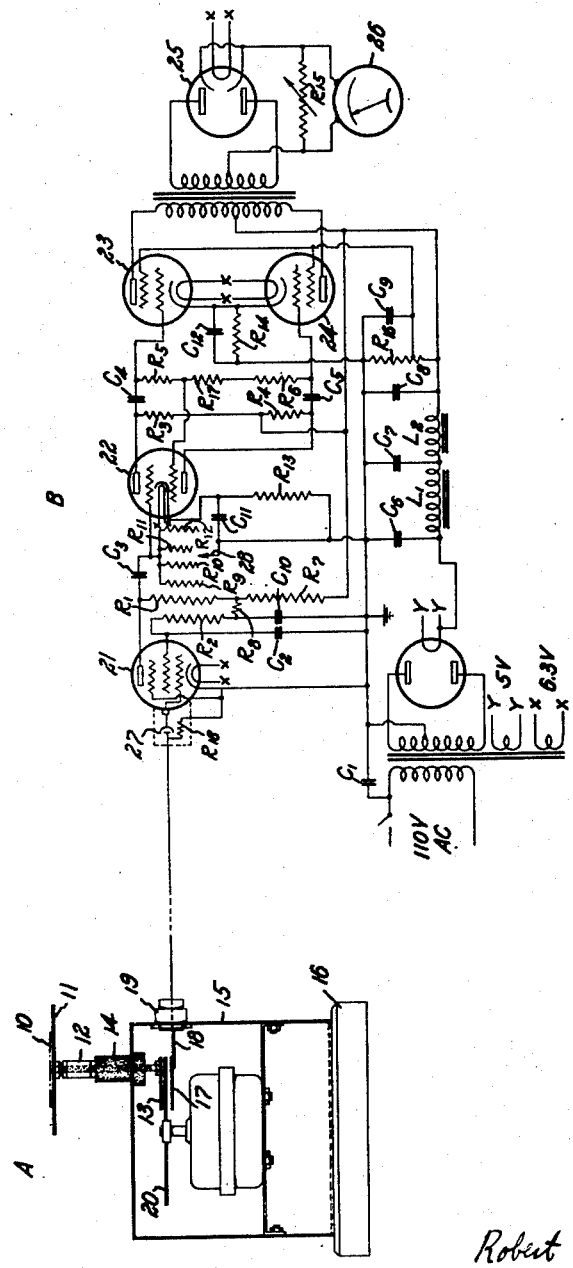

2,516,984

UNITED STATES PATENT OFFICE 2,516,984

MEASUREMENT OF ELECTROSTATIC CHARGES USING ROTATING CONVERTER

Robert S. Havenhill and Harold C. O'Brien, Beaver, Pa., assignors to St. Joseph Lead Company, New York, N. Y., a corporation of New York Application December 6, 1944, Serial No. 566,916

2 Claims. (Cl. 171—95)

This invention relates to the measurement of electrostatic charges and is particularly directed to apparatus adapted to measure the potential of electrostatic charges on materials of low capacity.

It has been found that the contact potentials of rubber stocks and particularly the effect on the contact potentials of various materials added to the stocks have a high correlation with the properties of the cured rubber compositions, such as the tensile strength. For the purpose of investigation of this and for the measurement of electrostatic potentials on other materials of low capacity, it is desirable to have an apparatus capable of giving reliable and reproducible determinations of the electrostatic charge on such materials.

A principal purpose of the invention, therefore, is to provide apparatus for the measurement of electrostatic charge on materials of low capacity.

This and other purposes and advantages are attained by the provision of apparatus comprising spaced electrode members, a conductive member adapted to be positioned in the electric field of the object the potential of which is to be measured, means for electrically connecting the conductive member to one of the electrodes, means for cyclically passing a blade member between the spaced electrode members at audio frequency to produce on the other of the electrode members a periodically varying charge having a maximum proportional to the electrostatic potential of the object, means for amplifying the charge, and indicating means responsive to the output of the amplifying means.

The invention will be more particularly described in connection with the accompanying drawing showing apparatus embodying the principles of the invention.

The single figure of the drawing shows an electrostatic modulator and an associated amplifying circuit and potential indicating device.

In the drawing, A represents an electrostatic modulator arrangement adapted to convert the electrostatic potential of the test sample into a fluctuating potential of audio frequency and B represents an arrangement of electrical circuit elements adapted to amplify audio frequency impulses provided by modulator A and to provide a visible or audible indication of the peak potential of the amplified impulses.

The modulator comprises a metal specimen holder 11 fastened to a metal rod 12 having at its opposite end an electrode 13. The rod 12 is preferably mounted by means of Lucite bushing 14 in the top of box 15 mounted on base 16. A second electrode 17 is positioned in parallel spaced relation to electrode 13 by means of a suitable conductive support 18 carried by insulating bushing 19 through the side of the box.

A fan having four conductive blades 20 positioned to pass between electrodes 13 and 17 is rotated at a speed such that the blades cut the field between electrodes 13 and 17 at audio frequency, for example, 300 cycles per second. Electrode 17 is connected to an audio frequency amplifier, the output of which may be connected to a speaker, a cathode ray oscillograph or an output meter. The shapes of the fan blades and of the grid plate 17 are preferably selected to produce a substantially sine wave voltage fluctuation. This allows less leakage in the grid circuit as the potential is at a maximum for only a short period of time, and the sine wave voltage can also be more effectively amplified and rectified by vacuum tube equipment in which there are no mechanically moving parts.

The amplifier shown by way of illustration in the drawing comprises input stage 6J7 tube 21, second audio stage and phase inverter 6N7 dual triode tube 22, and 2–6L6 beam power tubes 23, 24 operated in push-pull. An output rectifier 6H6 tube 25 is connected to output meter 26.

The electrode 17 of the modulator is connected to the grid of the input stage. The grid bias of the input stage is supplied by a one volt bias cell 27. The grid circuit of the second stage tube 22 is provided with a selector switch 28 so that various values of grid resistances can be switched in to take care of a wide range of input voltages and still obtain nearly full scale deflection on the output meter for all ranges.

The following are typical constants for the various circuit elements:

$C_1, C_2, C_3, C_4, C_5$, 0.1 mfd. 600 v. D. C.
$C_6, C_7, C_8, C_9, C_{10}$, 8 mfd. 600 v. D. C.
$C_{11}, C_{12}$, 50 mfd. 50 v. D. C.
$L_1, L_2$, 30 henry 150 Ma.
$R_1$, 200 M ohms 1W
$R_2$, 1 megohm 1W
$R_3, R_4$, 100 M ohms 1W
$R_5, R_6$, 500 M ohms 1W
$R_7, R_8$, 25 M ohms 1W
$R_9$, 100 ohms 1W
$R_{10}$, 500 ohms 1W
$R_{11}$, 1,000 ohms 1W
$R_{12}$, 500 M ohms 1W
$R_{13}$, 3,000 ohms 5W
$R_{14}$, 200 ohms 20W
$R_{15}$, 60 ohms 10W
$R_{16}$, 25 M ohms 50W
$R_{17}$, 15 M ohms 1W
$R_{18}$, 5 megohms 0.5W The amplifier illustrated has a gain of 110 db. and a power output of 20 watts.

In operation to determine the contact potential of a rubber stock, a specimen 10 of the sheeted stock is placed on specimen holder 11. A mirror surfaced steel plunger, not shown, is pressed into contact with the specimen and quickly removed, preferably by spring action. The charge thus produced on the rubber specimen by triboelectrification produces an electrostatic field between electrodes 13, 17. The audio frequency impulses provided by modulator A are linearly amplified by amplifier B and result in meter readings directly proportional to the potential on the test specimen.

The invention is not limited to the particular arrangement shown in the drawing for the purpose of illustrating the principles of the invention and the apparatus and method of the invention are adapted for use in measuring the charge on a wide variety of materials. For example, the charge on finely divided particles in air such as dust, grain and various pigments such as zinc oxide, can be measured, as well as the charges on rubber, synthetic rubber, plastics, fabric and yarn during processing. The charges on these materials can be measured while they are moving into, away from or in the processing machines as no direct connection to the device is necessary. The device may be mounted at a fixed distance from the charged object and the induced charge measured. If desirable, a suitable recording output meter can be used to give a permanent record of the electrostatic history of the charged materials.

We claim:

1. Apparatus for determining the electrostatic potential of objects of low capacity comprising an electrostatic modulator including spaced electrode members, a conductive member adapted to be positioned in the electric field of the object the potential of which is to be be measured, means electrically connecting said conductive member to one of said electrode members, a conductive blade member, means for cyclically passing said conductive blade member between said spaced electrode members at audio frequency to produce on the other of said electrode members a periodically varying charge having a maximum proportional to the electrostatic potential of the object; an audio frequency amplifier including an input stage having a vacuum tube with a cathode, a grid and an anode; said electrostatic modulator being connected to said audio frequency amplifier solely by a single conductor connected between the other of said spaced electrode members of said modulator and the grid of the input stage vacuum tube of said audio frequency amplifier; and indicating means responsive to the output of said audio frequency amplifier.

2. Apparatus as defined in claim 1 wherein said blade member is polybladed and is shaped with respect to said electrode members to provide a voltage fluctuation on said other electrode member having a substantially sine wave form.

ROBERT S. HAVENHILL.
HAROLD C. O'BRIEN.

REFERENCES CITED

The following references are of record in the file of this patent:

UNITED STATES PATENTS

| Number | Name | Date |
|---|---|---|
| Re. 21,137 | Firestone | July 4, 1939 |
| 1,705,480 | Scott-Huntington | Mar. 19, 1929 |
| 1,919,215 | Gunn | July 25, 1933 |
| 1,922,933 | Dirks | Aug. 15, 1933 |
| 2,032,932 | Hauffe et al. | Mar. 3, 1936 |
| 2,240,680 | Stuart | May 6, 1941 |
| 2,284,476 | MacKay | May 26, 1942 |